Aug. 14, 1956

T. R. SPALDING 2,759,175

LEAK DETECTOR FOR PIPE JOINT

Filed March 12, 1954

INVENTOR.
Thomas R. Spalding
BY
Roland A. Anderson
Attorney

United States Patent Office

2,759,175
Patented Aug. 14, 1956

2,759,175

LEAK DETECTOR FOR PIPE JOINT

Thomas R. Spalding, Spencerville, Ind., assignor to the United States of America as represented by the United States Atomic Energy Commission Application March 12, 1954, Serial No. 415,982

1 Claim. (Cl. 340—242)

The present invention relates to a device for detecting loss of fluid from a liquid-conveying pipe.

When a substance critical to a process or toxic to personnel is conveyed through a pipe system, it is desirable that any incipient leaks in the piping or pipe joints be detected without delay and that intelligence concerning the existence of the leak and the location thereof be transmitted, for example, to a remote control area. The invention disclosed in the specification below and the accompanying drawings is readily adapted to meet that need.

Figure 1:
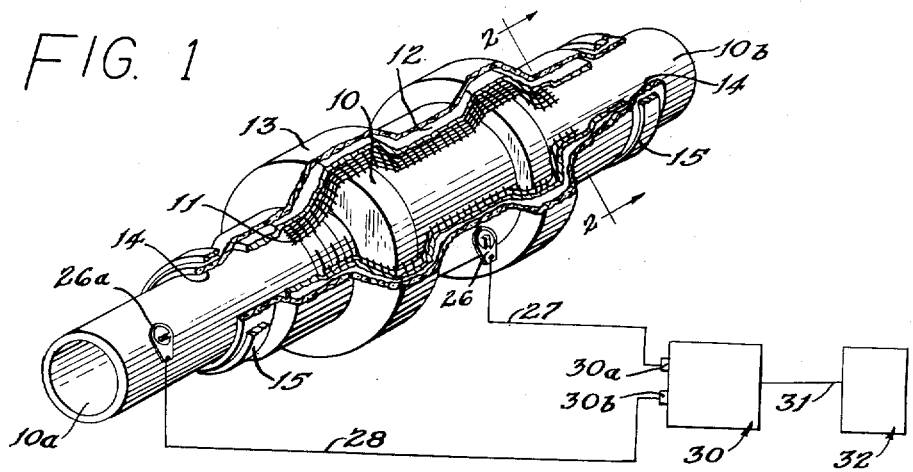
Fig. 1 is a perspective view with parts cut away of one form of the present invention and a pipe coupling to which it is affixed, and in addition shows schematically the electronic components used in conjunction with the invention.
Figure 2:
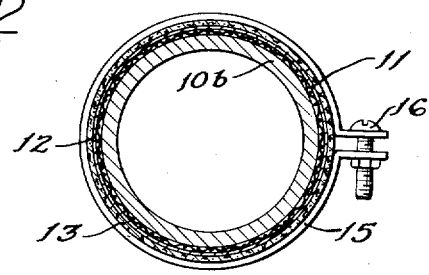
Fig. 2 is a cross sectional view taken along the line 2—2 in Fig. 1.

In Fig. 1, the one form of the device is shown applied to a coupling 10 connecting pipes 10a and 10b and includes a perforated layer or screen of electrical insulating material 11 which fits closely about the contour of the pipe joint 10 and the sections of pipe 10a and 10b adjacent thereto.

An electrically conductive thin metal sheet or foil 12, which may be of aluminum, extends around the insulating layer 11 and in direct engagement therewith. Thus the sheet 12 completely surrounds the pipe joint 10 and pipe sections 10a and 10b adjacent thereto, but is held free from electrical contact therewith by the insulating screen 11. A cover or wrapper member 13, made of a flexible but air- and moisture-tight material, extends about the sheet 12 and has end portions in contact with pipe sections 10a and 10b beyond the fitting 10, and beyond the ends of sheet 12, as indicated at 14. Bands 15 clamped by screws 16 about these end portions of the wrapper 13 cause the wrapper to seal the coupling 10 and the ends of the pipes 10a and 10b connected thereto against the entrance of moisture from the outside to the screen 11 which may give a false indication of leakage from the pipe.

Figure 3:
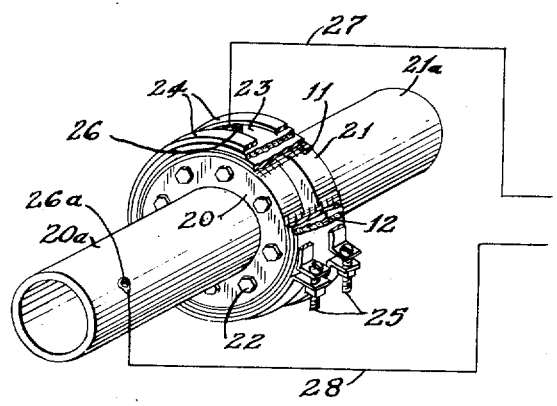
Fig. 3 is a perspective view of a second form of the invention, with parts cut away.

An alternate form of the invention useful on pipe joints where a welded flanged pipe end is joined by means of flange bolts to a second flanged pipe or fitting is shown in Fig. 3. A pipe flange 20 secured to a pipe 20a is joined to the flange 21 of a pipe 21a by means of flange bolts 22. The electrical insulating screen layer 11 is adapted to fit closely about the contour of the flanges. The metal sheet 12 extends around the insulating layer 11 and in direct contact therewith. A cover or wrapper member 23 extends about the sheet 12 and is held in place by means of straps 24 and bolts 25.

Shown in Figs. 1 and 3, is an electrical terminal 26 secured to the wrapper member 13 in Fig. 1 or wrapper member 23 in Fig. 3. The electrical terminal 26 penetrates the cover member 13, 23 and makes contact with the conducting metal sheet 12. An insulated electrical lead 27 is secured to the electrical contact 26; a second electrical lead 28 is connected electrically to the pipe 10a, 10b shown in Fig. 1 by means of terminal 26a, and connected to pipe 20a as shown in Fig. 3. Electrical leads 27 and 28 are further connected to terminals 30a and 30b, respectively, of an electronic relay 30. The electronic relay 30 may be connected by means of a suitable cable 31 to a remote annunciator 32.

Referring now to Fig. 1, an electrical potential is maintained between the conducting metal sheet 12 and the pipe 10b. When the insulating screen 11 is dry the impedance between the metal sheet and the pipe is large; as a consequence of this large impedance the circuit through the leads 27, 28 and the electronic relay 30 is open. When moisture or other fluid seeping out of the pipe 10a, 10b at the coupling 10 wets the insulating sheet 11, the impedance between the metal sheet 12 and the pipe 10a, 10b is reduced thereby closing the circuit between leads 27 and 28 and energizing the relay 30. The energized relay causes a current to flow in the cable 31 and activates the annunciator 32 which may be placed in a remote control area.

Moisture condensing on a cold pipe or moisture derived from some remote source and running down the outside of a pipe may wet the outer perimeter of a pipe at a point on a pipe where the present leak detector is mounted. To prevent extraneous moisture from triggering the detector the cover member 13 of the nature shown in Fig. 1 may be employed. Such a cover mounted over the sensitive elements of the detector protects them from chance extraneous wetting. In applications where extraneous wetting is a remote possibility, a cover member is shown in Fig. 3 at 23 may be utilized and thereby permit simpler installation of the invention.

The intention is to limit the invention only within the scope of the appended claim.

What is claimed is:

A leak detector for a pipe joint comprising a perforated insulating strip extending about the pipe joint so as to embrace the same, a conducting strip extending about the perforated insulating strip so as to embrace the same and to be held thereby out of contact with the joint and the pipe, an insulating cover wrapped about the conducting strip and regions of the pipe beyond the joint, the perforated insulating strip, and the conducting strip so as to prevent moisture external to the pipe from entering perforations in the insulating strip, and electrical means connected to the pipe and the conducting strip and responsive to the escape of moisture through the joint and into the perforations in the insulating strip.

References Cited in the file of this patent

UNITED STATES PATENTS

| | | |
|---|---|---|
| 336,773 | Weil | Feb. 23, 1886 |
| 1,801,791 | Breisky et al. | Apr. 21, 1931 |
| 2,056,085 | Alles | Sept. 29, 1936 |
| 2,446,760 | Hampson | Aug. 10, 1948 |